United States Patent [19]

Mimura

[11] Patent Number: 5,379,217

[45] Date of Patent: Jan. 3, 1995

[54] VEHICLE ELECTROMAGNETIC CLUTCH CONTROL DEVICE

[75] Inventor: Munehiko Mimura, Hyogo, Japan

[73] Assignee: Mitsubishi Denki Kabushiki Kaisha, Tokyo, Japan

[21] Appl. No.: 892,061

[22] Filed: May 29, 1992

[30] Foreign Application Priority Data

May 29, 1991 [JP] Japan ................................. 3-124266

[51] Int. Cl.[6] ............................................. F16D 27/00
[52] U.S. Cl. .............................. 364/424.1; 318/558; 477/176; 477/179
[58] Field of Search ............. 364/424.1; 192/0.03, 192/0.044, 0.052, 0.055, 0.07, 0.075; 74/866; 318/558, 563, 568.24, 599, 680; 361/187; 363/41; 307/10.1

[56] References Cited

U.S. PATENT DOCUMENTS 4,854,920 8/1989 Mimura .
4,915,072 4/1990 Caron et al. .
5,072,165 12/1991 Mimura ........................ 318/558
5,083,273 1/1992 Nishiwaki et al. ............. 74/866
5,094,333 10/1992 Mimura ..................... 192/0.075

FOREIGN PATENT DOCUMENTS 0104613 4/1984 European Pat. Off. .
57-51530 3/1982 Japan .
61-31533 2/1986 Japan .
62-31533 2/1987 Japan .
2090018 6/1982 United Kingdom .

Primary Examiner—Emanuel T. Voeltz
Assistant Examiner—Edward J. Pipala
Attorney, Agent, or Firm—Sughrue, Mion, Zinn, Macpeak & Seas

[57] ABSTRACT

In a vehicle electromagnetic clutch control device, a PWM modulator is provided in a microcomputer. In the microcomputer, a current instruction signal is calculated according to engine control data and travel control data, and is compared with an output current feedback signal, to obtain a difference signal therebetween, so as to cause the PWM modulator to output a pulse width modulation signal to control the on-off operation of a PWM output transistor.

2 Claims, 2 Drawing Sheets

VEHICLE ELECTROMAGNETIC CLUTCH CONTROL DEVICE

BACKGROUND OF THE INVENTION

1. Field of the Invention

This invention relates to a device for controlling an electromagnetic clutch on a vehicle electromagnetic clutch control device which performs a clutch transmission torque control operation by controlling the supply of current.

2. Prior Art

A conventional vehicle electromagnetic clutch control device has been disclosed, for instance, by Japanese Patent Application (OPI) No. 31533/1987. The control device is as shown in FIG. 3.

In FIG. 3, reference numeral 100 designates a microcomputer. The micro-computer 100 obtains a current instruction signal according to travel control data SD and engine control data SE, and applies it to a digital-to-analog (D/A) converter 111.

In response to the current instruction signal, the D/A converter 111 outputs an analog signal, namely, a current instruction signal IS, which is applied to the positive input terminal (+) of a pulse width modulation (PWM) control comparator 112, to the negative input terminal (−) of which an output current feedback signal IF provided by a current detecting amplifier 7 is applied.

The PWM control comparator 112 obtains the difference between the current instruction signal IS and the output current feedback signal IF, and performs a pulse width modulation according to the difference. The output of the comparator 112 is applied through a resistor 205 to the base of a transistor 203.

The base of the transistor 203 is grounded through a resistor 204, the emitter is grounded directly, and the collector is connected to the base of a PWM transistor 2 and further connected through a resistor 201 to a power source (voltage $V_{IG}$).

The emitter of the PWM transistor 2 is connected to the power source, and the collector is connected to an output terminal 113 and grounded through a circulation diode 3. The output terminal 113 is connected through an electromagnetic clutch 6 to another output terminal 114. The electromagnetic clutch 6 comprises slip springs 601 and 602, and a clutch coil 603. Clutch current is supplied through the slip springs 601 and 602 to the clutch coil 603.

The microcomputer 100 is adapted to output a clutch release signal SO, which is applied through a resistor 408 to the base of a transistor 406. The base of the transistor 406 is grounded through a resistor 407, the collector is connected through resistors 404 and 405 to the power source, and the emitter is grounded.

The connecting point of the resistors 404 and 405 is connected to the base of a transistor 403. The emitter of the transistor 403 is connected to the power source, and the collector is connected through a resistor 402 to the base of a quick-break transistor 4.

The collector of the quick-break transistor 4 is connected to the output terminal 114, and connected through a constant voltage diode 401 to the base thereof. The emitter of the quick-break transistor 4 is grounded through a current detecting resistor 5. The latter 5 is to detect a clutch current.

Both terminals of the current detecting resistor 5 are connected through a resistor (reference resistor) 701 and a resistor (adjust resistor) 702 to the positive input terminal (+) and negative input terminal (−) of the current detecting amplifier 7, respectively. The negative input terminal (−) of the current detecting amplifier 7 is connected through a resistor (feedback resistor) 703 to the output terminal thereof, at which the above-described output current feedback signal IF is provided.

The operation of the vehicle electromagnetic clutch control device thus organized will be described. A control unit (not shown) calculates a vehicle speed and an engine speed (a number of revolutions per minute of an engine). The aforementioned SD is applied to the microcomputer 100 according to the vehicle speed and the engine speed.

Thereafter, the microcomputer 100 receives the engine control data SE. The microcomputer 100 output a current instruction signal IS according to the travel control data SD and the engine control data SE.

The current instruction signal IS thus outputted is applied to the D/A converter 111, where it is converted into the analog signal IS, which is applied to the positive input terminal (+) of the PWM control comparator 112, to the negative input terminal (−) of which the output current feedback signal IF provided at the output terminal of the current detecting amplifier 7 is applied. Hence, the PWM control comparator 112 compares the current instruction signal IS with the output current feedback signal IF to output a difference signal.

The difference signal is subjected to pulse width modulation. The output of the PWM control comparator 112 is applied through the resistor 205 to the transistor 203 to turn the latter on and off, thereby to turn the PWM output transistor 2 on and off. That is, the PWM output transistor 2 is rendered conductive (on) or non-conductive (off) according to the pulse width with which the difference signal is pulse-width-modulated.

Thus, the application of a clutch current to the electromagnetic clutch is controlled according to the on and off states of the PWM output transistor 2. More specifically, when the PWM output transistor 2 is rendered conductive (on), the clutch current is allowed to flow in the electromagnetic clutch 6 through the output terminal 113, and when the transistor 2 is rendered non-conductive (off), the clutch current is not allowed to flow in the clutch 6. When the PWM output transistor 2 is non-conductive (off), a circulation current is not allowed to flow in the electromagnetic clutch 6.

On the other hand, the on-off operation of the quick-break transistor 4 is controlled by the release signal SO. When the release signal SO is applied through the resistor 408 to the transistor 406 to turn the latter 406 on, the transistor 403 is turned on, as a result of which the quick-break transistor 4 is also turned on. Hence, when the PWM output transistor 2 is rendered conductive (on) by the difference signal pulse-width-modulated, the clutch current is allowed to flow from the power source in the closed loop of the PWM output transistor 2, the output terminal 113, the electromagnetic clutch 6, the output terminal 114, the quick-break transistor 4, the current detecting resistor 5, and ground.

In this operation, the clutch current is detected by the current detecting resistor 5, and a voltage drop is developed across the latter 5. The voltages at both terminals of the current detecting resistor 5 are applied through the resistors 701 and 702 to the input terminals of the current detecting amplifier 7, respectively, so that the latter 7 outputs the above-described output current feedback signal IF.

As is apparent from the above description, the clutch current is allowed to flow in the electromagnetic clutch 6 according to the PWM modulation signal of the difference signal provided by the PWM control comparator 112, to drive the electromagnetic clutch. On the other hand, the electromagnetic clutch 6 is released by the clutch release signal SO outputted by the microcomputer 100.

The conventional vehicle electromagnetic clutch control device thus constructed suffers from the following difficulties: In the control device, the D/A converter 111 and the PWM control comparator 112 occupy relatively larger areas on the printed circuit board, thus making the control device bulky.

The current instruction signal outputted by the microcomputer 100 does not reflect variations in supply voltage. Therefore, it is impossible to correct the actual clutch current accurately with respect to the PWM modulation signal outputted by the PWM control comparator.

SUMMARY OF THE INVENTION

Accordingly, an object of this invention is to eliminate the above-described difficulties accompanying a conventional vehicle electromagnetic clutch control device.

More specifically, an object of the invention is to provide a vehicle electromagnetic clutch control device which is simplified in circuitry, thus allowing a reduction in area of the printed circuit board, and can be miniaturized as much.

Another object of the invention is to provide a vehicle electromagnetic clutch control device in which, when the supply voltage changes, the pulse width modulation signal outputted by the microcomputer is corrected, whereby the actual clutch current is corrected with high accuracy.

In order to achieve the foregoing objects of the invention, a vehicle electromagnetic clutch control device according to the invention comprises a microcomputer including at least a PWM modulator.

Also, a vehicle electromagnetic clutch control device according to the invention, comprises a microcomputer which has at least a function of PWM modulating and a function of converting a supply voltage into a digital signal.

In the vehicle electromagnetic clutch control device according to the present invention, in the microcomputer a current instruction signal is calculated according to engine control data and travel control data, and the current instruction signal is compared with an output current feedback signal, to provide a difference signal therebetween, and the PWM modulator outputs a PWM modulation signal according to the difference signal. Accordingly, in the vehicle electromagnetic clutch control device, when compared with the conventional one, the number of components provided outside the microcomputer is less, and the printed circuit board can be smaller in area. That is, the vehicle electromagnetic clutch control device can be miniaturized as much.

Also, in the vehicle electromagnetic clutch control device, the microcomputer calculates a current instruction signal according to engine control data and travel control data, and compares the current instruction signal with an output current feedback signal, to provide a difference signal, and outputs a PWM modulation signal according to the difference signal. The supply voltage is converted into a digital signal, which is used for correction of the above-described PWM modulation signal.

DETAILED DESCRIPTION OF THE INVENTION

Figure 1:
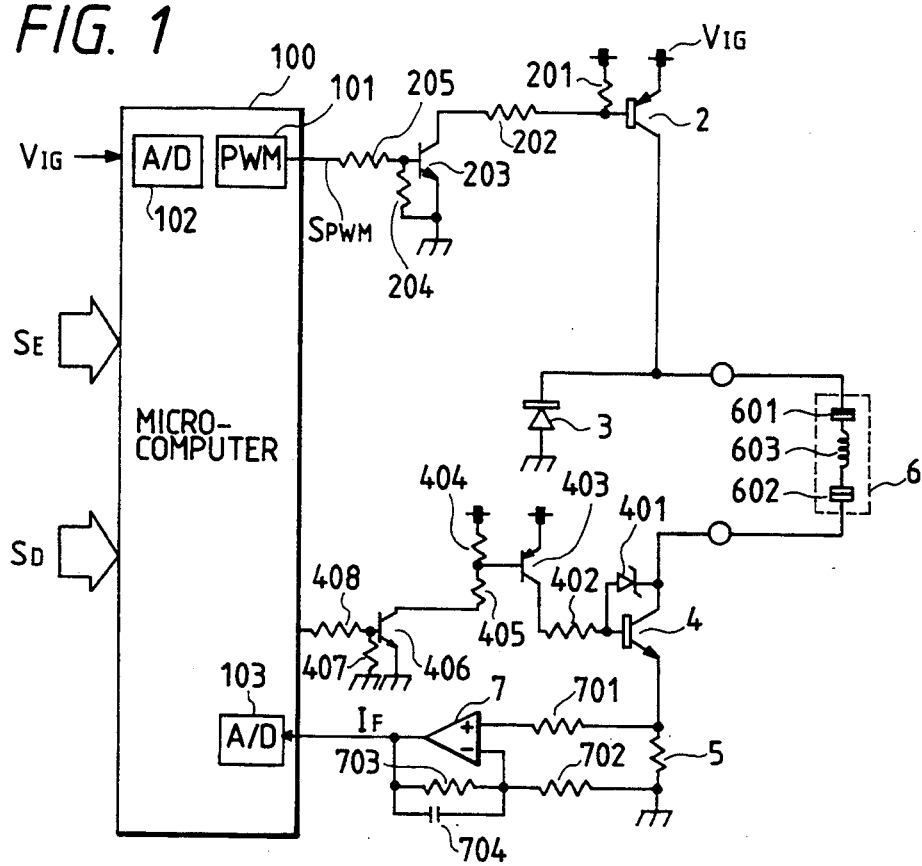
FIG. 1 is a circuit diagram, partly as a block diagram, showing an example of a vehicle electromagnetic clutch control device according to this invention.
Figure 3:
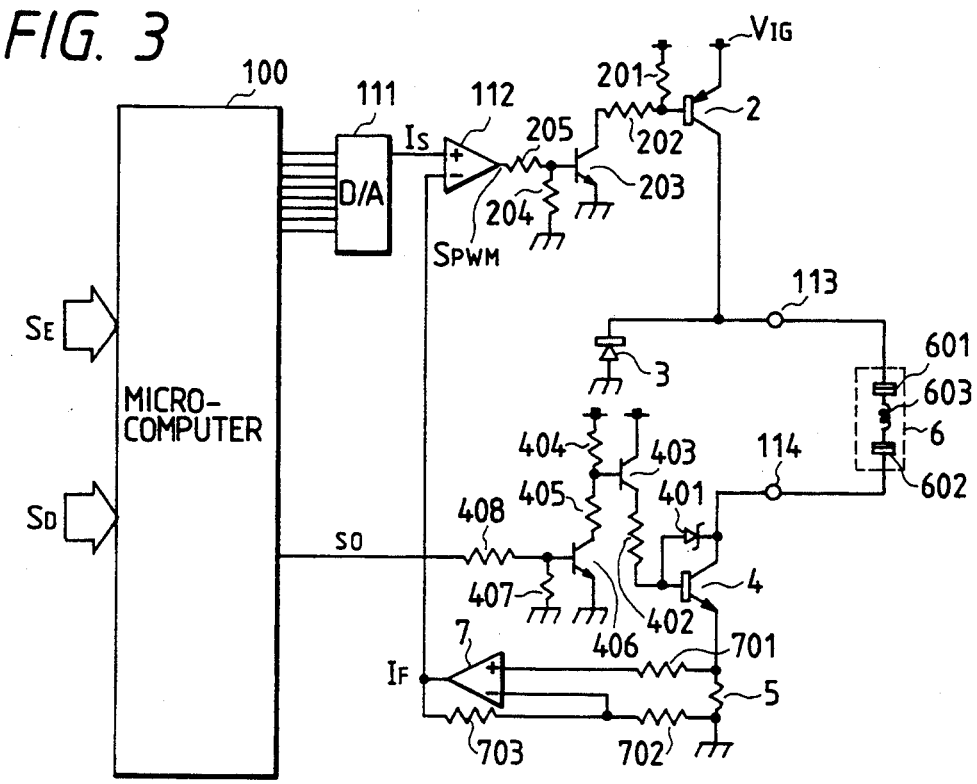
FIG. 3 is a circuit diagram, partly as a block diagram, showing a conventional vehicle electromagnetic clutch control device.

One example of a vehicle electromagnetic clutch control device according to this invention will be described with reference to the accompanying drawings. The control device is as shown in FIG. 1. In FIG. 1, parts corresponding functionally to those which have been described with reference to FIG. 3 are therefore designated by the same reference numerals or characters. Therefore, mainly parts different from those in FIG. 3 will be described hereunder.

As is apparent from comparison of FIG. 1 with FIG. 3, in the control device of the invention shown in FIG. 1, the D/A converter 111 and the PWM control comparator 112 of the conventional control device shown in FIG. 3 are eliminated which are connected between the microcomputer 100 and the transistor 203, and instead the microcomputer 100 includes a PWM modulator 101, and has a D/A conversion function, and further includes A/D converters 102 and 103.

The PWM modulator 101 is adapted to provide a signal SPWM having a frequency or duty ratio (on/off duty ratio) programmed.

The A/D converter 102 converts the supply voltage $V_{IG}$ into a digital signal, and the A/D converter 103 leads the current feedback signal IF into the microcomputer 100. The other arrangements are the same as those in the conventional control device. In FIG. 1, reference numeral 704 designates a high frequency filtering capacitor for removing high frequency ripple components from the current feedback signal IF.

The operation of the vehicle electromagnetic clutch control device thus organized will be described. However, a description of the operations of parts which are the same as those in the conventional control device shown in FIG. 3 will be omitted. That is, mainly the operation of the microcomputer 100 will be described with reference to a flow chart of FIG. 2 hereunder.

Figure 2:
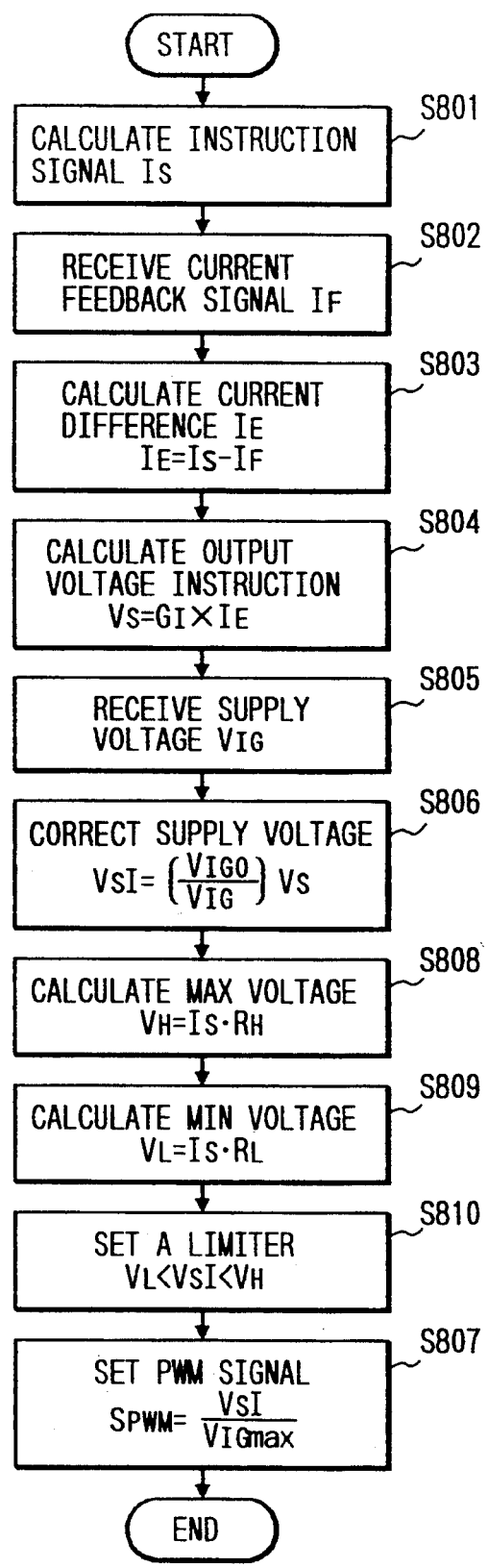
FIG. 2 is a flow chart for a description of the operation of a microcomputer in the control device shown in FIG. 1.

The flow chart of FIG. 2 shows processes programmed in the microcomputer 100. In Step S801, the microcomputer 100 forms the current instruction signal IS according to the engine control data SE or the travel control data SD.

Next, in Step S802, the microcomputer receives the output current feedback signal IF from the current detecting amplifier 7. In the microcomputer 100, the signal IF this received is converted into a digital signal by the A/D converter 103, and the current difference IE between the current instruction signal IS provided in Step S801 and the current feedback signal IF thus digitized is obtained (Step S803).

Next, in Step S804, an output voltage instruction value $V_S$ is calculated by using the current difference IE thus obtained as follows:

$$V_S = GI \times IE$$

where GI is the current control gain.

In Step S805, the microcomputer 100 receives the supply voltage $V_{IG}$, which is applied to the A/D converter 102, where it is converted into a digital signal. In Step S806, a correcting operation is performed against variations in supply voltage according to the following equation:

$$VSI = (VIGO/VIG)VS$$

where VIGO is the rated supply voltage.

Next, in Step S807, a PWM set signal SPWM is obtained by using the corrected supply voltage VSI and the maximum supply voltage $V_{IGMAX}$ as follows:

$$SPWM = VSI/V_{IGMAX}$$

Thus, the PWM output transistor 2 performs an output operation with an on/off duty ratio and frequency preset.

In Step S808 a maximum value VH is calculated according to the following equation by using the signal into which the output current feedback signal IF of the current detecting amplifier 7 is converted by the A/D converter 103:

$$VH = IS \cdot RH$$

where RH is the maximum load resistance with the clutch resistance as a load resistance.

In Step S809 a minimum value VL is calculated as follows:

$$VL = IS \cdot RL$$

where RL is the minimum load resistance with the clutch resistance as a load resistance.

In Step S810, the VSI calculated in Step S806 is subjected to upper and lower limit processing by the maximum value VH and the minimum value VL calculated by the respective Steps S808 and S809. The VSI which has been subjected to the upper and lower limit processing comes into a PWM signal value which is in the form of a final output in Step S807.

If the load resistance R (the aforementioned clutch resistance) and the current instruction signal IS are known in advance, then the maximum voltage and the minimum voltage can be calculated in Steps S808 and S809, respectively. For instance, RH is the resistance when the clutch temperature is 200° C., and RL is the resistance when the clutch temperature is −40° C. And the corrected supply voltage VSI is set to come between the maximum voltage VH and the minimum voltage VL in Step S810. Therefore, there is a case where the VSI in Step S806 is not identical with that in Step S807.

The A/D conversion sampling time of the microcomputer 100 is often slower than the frequency of the pulse width modulation signal SPWM. Therefore, the high frequency filtering capacitor 704 is provided for stabilization of the average value of the output current feedback signal IF.

In this connection, it goes without saying that, by increasing the frequency of the pulse width modulation signal SPWM, the current ripple components can be decreased, and therefore the high frequency filtering capacitor 704 can be eliminated.

In order to decrease the current difference IE, it is essential that the output current feedback signal IF is improved in accuracy (or resolution); that is, it should be of at least 8 bits.

In order to decrease the current difference IE, it is also necessary that the output voltage resolution is improved; that is, it should be of at least 8 bits.

The correction of the supply voltage is carried out as follows: That is, in the case where the duty ratio is maintained unchanged, the actual output voltage (or the voltage applied to the load) is changed with the supply voltage, and therefore the duty ratio is corrected by the feedback of the supply voltage.

On the other hand, if, in the microcomputer 100, the upper or lower limit of the supply voltage (PWM output voltage) is known with respect to the current instruction signal value in advance, a limiter may be provided for the duty ratio of the PWM modulation signal as a countermeasure against the erroneous operation of the current detector.

As was described above, in the vehicle electromagnetic clutch control device according to this invention, the microcomputer has at least a PWM modulation function. That is, in the microcomputer, the current instruction signal is formed according to the engine control data and the travel control data, and compared with the output current feedback signal to obtain the difference therebetween, and the PWM modulation signal for controlling the on-off operation of the PWM output transistor is outputted according to the difference thus obtained. This feature makes it unnecessary to provide the D/A converter and the PWM control comparator outside the microcomputer. Accordingly, the control device, when compared with the conventional one, is simplified in circuitry, and can be miniaturized as much.

Further, in the vehicle electromagnetic clutch control device according to this invention, the A/D converter for converting the supply voltage into a digital signal is provided in the microcomputer, so that the PWM modulation signal is corrected according to the output of the A/D converter. Therefore, even when the supply voltage varies, the clutch current can be corrected with high accuracy.

What is claimed is:

1. A vehicle electromagnetic clutch control device, comprising:
   a microcomputer for calculating a current instruction signal according to travel control data and engine control data and for outputting a clutch release signal and having an analog-to-digital converter for converting a supply voltage into a digital signal, said microcomputer including a PWM modulator for obtaining a difference between said current instruction signal and an output current feedback signal to output a pulse-width modulation signal according to said difference and said digital signal;
   a PWM output transistor which operates in accordance with said pulse-width modulation signal to allow a clutch current to flow in an electromagnetic clutch;
   a quick-break transistor which is controlled by said clutch release signal to interrupt said clutch current which flows when said PWM output transistor is non-conductive;

a current detecting resistor for detecting said clutch current flowing when said quick-break transistor is conductive; and a current detecting amplifier for detecting a voltage developed across said current detecting resistor to apply said output current feedback signal to said microcomputer.

2. A vehicle electromagnetic clutch control device as claimed in claim 1, wherein said microcomputer further includes an analog-to-digital converter for receiving said output current feedback signal to subject said output current feedback signal to analog-to-digital conversion.

* * * * *